United States Patent [19]
Izumitani et al.

[11] 3,785,835
[45] Jan. 15, 1974

[54] ANOMALOUS DISPERSION GLASS

[75] Inventors: Tetsuro Izumitani; Isao Masuda, both of Tokyo, Japan

[73] Assignee: Hoya Glass Works, Ltd., Shinjuku-ku, Tokyo, Japan

[22] Filed: May 19, 1972

[21] Appl. No.: 254,965

[30] Foreign Application Priority Data
May 21, 1971 Japan.............................. 46-34546

[52] U.S. Cl. ............................................ 106/47 Q
[51] Int. Cl. .............................................. C03c 3/16
[58] Field of Search ..................... 106/47 Q, 47 R

[56] References Cited
UNITED STATES PATENTS
2,996,391  8/1961  Weissenberg et al. ............. 106/47 Q
3,711,264  1/1973  Robinson et al. .................. 106/47 Q FOREIGN PATENTS OR APPLICATIONS
1,089,935  9/1960  Germany .......................... 106/47 Q

OTHER PUBLICATIONS

Schroeder, H.,"Oxide Layers Deposited from Organic Solutions" in Physics of Thin Films edited by Hass et al. 1969, Vol. 5 pg. 137.

*Primary Examiner*—Helen M. McCarthy
*Attorney*—Richard C. Sughrue et al.

[57] ABSTRACT

An anomalous dispersion glass having an Abbe's number ($vd$) of 58–68 and a partial dispersion ratio (Phg) of 0.4425–0.4650, produced by adding 0.3–7.0 wt. parts of $CeO_2$ and 0–2 wt. parts of $Sb_2O_3$ to 100 wt. parts of phosphate glass which is composed of $P_2O_5$ 40–70 wt. percent, $B_2O_3$ 1–21 wt. percent, $Al_2O_3$ 1–8 wt. percent, $B_2O_3+Al_2O_3$ 2–24 wt. percent, BaO 8–42 wt. percent, ZnO 0–9 wt. percent, MgO 0–7 wt. percent, CaO 0–7 wt. percent, SrO 0–11 wt. percent, $La_2O_3$ 0–7 wt. percent, where $BaO+MgO+ZnO+SrO+CaO+La_2O_3$ are 15–52 wt. percent.

2 Claims, 1 Drawing Figure

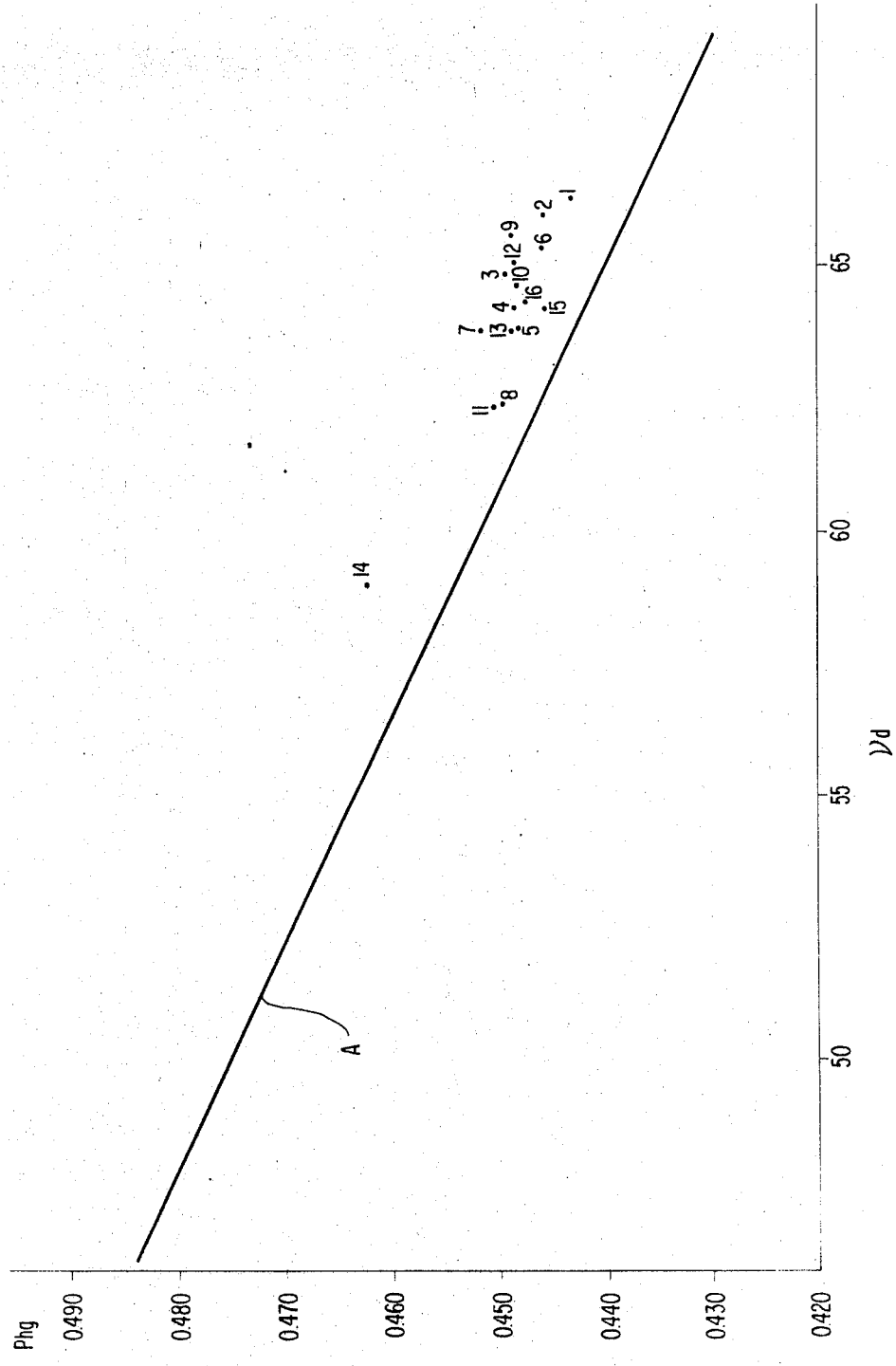

ANOMALOUS DISPERSION GLASS

BACKGROUND OF THE INVENTION

1. Field of the Invention

This invention relates to an anomalous dispersion glass suitable for producing a superachromatic lens assembly.

2. Description of the Prior Art

In order to design a superachromatic lens assembly, the chomatic aberration between 2 lights having mutually different wavelengths must be removed, and the residual chromatic aberration or the secondary spectrum must be minimized on a wide wavelength range. This secondary spectrum, however, cannot be minimized on a wide wavelength spectrum range by using only normal dispersion glass where the relationship between the Abbe's number ($\nu d$) and the partial dispersion ratio (Phg) on the g–h lines is linear. Therefore, a special glass having a partial dispersion ratio different from that of a normal dispersion glass, i.e., an anomalous dispersion glass having a non-linear relationship between the ($\nu d$) value and the (Phg) value, is required for producing a superachromatic lens assembly.

Generally, an anomalous dispersion glass having an anomalous dispersion property in the zone near the ultraviolet range is required, taking the kind of photosensitive material, the refractive index of the dispersion and the light wavelength sensitivity of the photoelectric tube into consideration. However, such an anomalous dispersion glass must have an Abbe's number as high as possible in order to simultaneously minimize spherical aberration and chromatic aberration. Generally, the partial dispersing ratio describing these properties is shown approximately by $\eta g - \eta F/\eta F - \eta c, \eta h - \eta g/\eta F - \eta c$, or $\eta i - \eta h/\eta F - \eta c$. The $\eta h - \eta g/\eta F - \eta c$ value is adopted as an indication of the anomalous dispersion property in this disclosure.

A conventional anomalous dispersion glass containing $TiO_2$ has a high Abbe's number but is unstable due to the influence of the $TiO_2$. Much empirical experimentation has been carried out to obtain an anomalous dispersion glass which is stable and has a high Abbe's number, and a favorable anomalous dispersion glass was found to be produced by adding $CeO_2$, which has a strong absorption intensity in the ultraviolet ray zone near the visible light zone, to a phosphate glass. The phosphate glass, however, is tinged yellow by the $Ce^{4+}$ ion, and therefore this anomolous dispersion glass cannot be put to practical use.

SUMMARY OF THE INVENTION

This invention provides an improved anomalous dispersion glass having an high Abbe's number and anomalous dispersion property in the short wave light zone, which has good stability, good melting property and durability against chemical attack.

The anomalous dispersion glass according to this invention is produced by adding both 0.3–7.0 wt. parts of $CeO_2$ and up to 2 wt. parts, e.g., 0–2 wt. parts of $Sb_2O_3$ to 100 wt. parts of phosphate glass composed of $P_2O_5$ 40–70 wt. percent, $B_2O_3$ 1–21 wt. percent, $Al_2O_3$ 1–8 wt. percent, $B_2O_3+Al_2O_3$ 2–24 wt. percent, BaO 8–42 wt. percent. ZnO 0–9 wt. percent, MgO 0–7 wt. percent, CaO 0–7 wt. percent, SrO 0–11 wt. percent, $La_2O_3$ 0–7 wt. percent, and $BaO+MgO+ZnO+SrO+CaO+La_2O_3$ 15–52 wt. percent, and has an Abbe's number of 58–68, and Phg value of 0.4425–0.4650.

The drawing is a plot of the Abbe's number versus partial dispersion ratio for glasses of this invention and the prior art.

DETAILED DESCRIPTION OF THE INVENTION

As the $P_2O_5$, which is the primary component of the phosphate glass, exhibits an absorption in the short wavelength zone apart from the visual light zone, the dispersion curve of the refractive index vs the wavelength in the visual light zone is gentle and the Abbe's number can be increased. In the case that the $P_2O_5$ content is reduced below 40 percent, the Abbe's number becomes too low, whereas in the case that the $P_2O_5$ content exceeds 70 percent, the stability of the glass is worsened.

$CeO_2$ is decomposed into $Ce^{3+}$ and $Ce^{4+}$ ions in the glass, and both ions exhibit a strong absorption intensity in the ultraviolet ray zone near the visual light zone. Accordingly, the addition of the $CeO_2$ influences the dispersion curve, but this influence is restricted to the narrow range of a relatively short wave zone (about 250–450 m$\mu$) by suitably selecting the $CeO_2$ content, and the $CeO_2$ scarcely effects the visual light zone near the C line and the F line. Therefore, the addition of $CeO_2$ imparts a favorable anomalous dispersion property to the glass to provide relatively a large dispersion property in the ultraviolet ray zone and does not reduce the Abbe's number. The effect of $CeO_2$ in imparting a good anomalous dispersion property to the glass is similar to that of known $TiO_2$, but $CeO_2$ is not detrimental to the stability of the glass as is $TiO_2$. This permits one to add considerable amounts of $CeO_2$ to the phosphate glass composition. However, a glass containing less than 50 percent phosphate is readily and strongly colored yellow by adding only 0.5 percent of $CeO_2$, a detriment due to the $Ce^{4+}$ ions. In order to apply such a $CeO_2$ containing phosphate glass to practical use, the $Ce^{4+}$ ions must be reduced into $Ce^{3+}$ ions. Although a phosphate glass containing $P_2O_5$ as the primary component is more acidic than other glasses, the yellow coloring due to $Ce^{4+}$ ions cannot be prevented. $Sb_2O_3$, which is known as an oxidizer in the presence of nitrate, serves as a reducing agent for ions having an high oxidation-reduction potential. Thus the yellow coloring of the phosphate glass due to the $Ce^{4+}$ ion can be prevented by adding a small amount of $Sb_2O_3$ to the phosphate glass. The amount of $Sb_2O_3$ added to the glass may be as low as possible to prevent the yellow coloring. The addition of $Sb_2O_3$ has no effect on the devitrification and chemical durability of the glass, and is effective to improve the stability of some special glass compositions.

If the $CeO_2$ content is reduced below 0.3 percent, the anomalous dispersion property is not observed in the resulting glass. On the other hand, if the $CeO_2$ content exceeds 7.0 percent the Abbe's number becomes low and the yellow coloring due to $Ce^{4+}$ ion is difficult to erase. The yellow coloring of the glass due to the $CeO_2$ addition becomes stronger as the amount of $CeO_2$ increases and the amount of $P_2O_5$ decreases. The amount of $Sb_2O_3$ to be added to the glass is restricted below 2.0 percent so as to not decrease the Abbe's number.

Since a glass containing solely $P_2O_5$ as the glass forming component has a narrow vitrification range, poor stability and inferior chemical durability, both $B_2O_3$ and $Al_2O_3$ are added to the glass composition. The amount of $B_2O_3$ and $Al_2O_3$ to be added to the glass are 1–21 percent and 1–8 percent, respectively. The sum of $B_2O_3$ and $Al_2O_3$ ranges from 2–24 percent.

Oxides of alkaline earth metals, such as BaO, MgO, ZnO, CaO, SrO and $La_2O_3$, are favorable glass modifiers for the glass of this invention. 8–42 percent of BaO improves the stability of the glass 0–7 percent of MgO also improves the stability of the glass together with the other alkaline earth metal oxides. 0–9 percent of ZnO improves both stability and chemical durability. 0–7 percent of CaO improves durability of the glass against chemicals. 0–11 percent of SrO is effective to improve the stability of the glass in the case that it contains a relatively small amount of $P_2O_5$. 0–7 percent of $La_2O_3$ improves the resistance of the glass to chemicals. The sum of the amounts of these modifiers is preferably in the range of from 15 percent to 52 percent.

Preferred ranges for the components of the glass composition of this invention are as follows:

$CeO_2$ — 0.5 – 6.0 — wt. parts
$Sb_2O_3$ — 0.2 – 1.5
$P_2O_5$ — 43.0 – 65.0 — wt. percent
$B_2O_3$ — 1.5 – 9.0
$Al_2O_3$ — 2.0 – 4.0
$B_2O_3+Al_2O_3$ — 5.0 – 10.0
BaO — 13.0 – 40.0
ZnO — 0.0 – 8.0
MgO — 0.0 – 6.0
CaO — 0.0 – 6.0
SrO — 0.0 – 10.0
$La_2O_3$ — 0.0 – 6.0
$BaO+ZnO+MgO+CaO+SrO+La_2O_3$ — 30.0 – 51.0

Some examples of this invention will be described with reference to Table (1) showing the composition of each of the glass specimens; Table (2) showing several physical properties of the glass specimens listed in Table (1); and the drawing which shows the relationship between the Abbe's number ($\nu d$) of a normal dispersion glass and the partial dispersion ratio (Phg) thereof, and also the relationship between the Abbe's number ($\nu d$) of the anomalous dispersion glass of this invention and the practical dispersion ratio (Phg) thereof.

In the drawing, a line (A) shows the relationship between $\nu d$ and Phg for the normal dispersion glass, whereas the dots show the relationship for the anomalous dispersion glass specimens according to this invention. The numerals on each dot correspond to the specimen number in the tables.

TABLE 1

| specimen No. | $P_2O_5$ | $B_2O_3$ | $Al_2O_3$ | BaO | ZnO | MgO | CaO | SrO | $La_2O_3$ | $CeO_2$ | $Sb_2O_3$ |
|---|---|---|---|---|---|---|---|---|---|---|---|
| 1 | 65.0 | 1.5 | 3.5 | 14.0 | 4.0 | 6.0 | 6.0 | 0 | 0 | 1.0 | 0 |
| 2 | 65.0 | 1.5 | 3.5 | 14.0 | 4.0 | 6.0 | 6.0 | 0 | 0 | 2.1 | 0.2 |
| 3 | 65.0 | 1.5 | 3.5 | 14.0 | 4.0 | 6.0 | 6.0 | 0 | 0 | 4.2 | 0.8 |
| 4 | 65.0 | 1.5 | 3.5 | 14.0 | 4.0 | 6.0 | 6.0 | 0 | 0 | 5.1 | 1.0 |
| 5 | 65.0 | 1.5 | 3.5 | 14.0 | 4.0 | 6.0 | 6.0 | 0 | 0 | 6.3 | 1.2 |
| 6 | 55.0 | 1.5 | 3.5 | 30.0 | 8.0 | 2.0 | 0 | 0 | 0 | 1.0 | 0 |
| 7 | 55.0 | 1.5 | 3.5 | 30.0 | 8.0 | 2.0 | 0 | 0 | 0 | 2.1 | 0.7 |
| 8 | 55.0 | 1.5 | 3.5 | 30.0 | 8.0 | 2.0 | 0 | 0 | 0 | 5.2 | 1.5 |
| 9 | 46.0 | 7.0 | 2.0 | 41.0 | 0 | 0 | 0 | 0 | 4.0 | 0.5 | 0.2 |
| 10 | 46.0 | 7.0 | 2.0 | 41.0 | 0 | 0 | 0 | 0 | 4.0 | 1.0 | 0.2 |
| 11 | 46.0 | 7.0 | 2.0 | 41.0 | 0 | 0 | 0 | 0 | 4.0 | 5.2 | 1.8 |
| 12 | 43.0 | 4.0 | 2.0 | 33.9 | 5.6 | 0 | 0 | 9.5 | 2.0 | 0.5 | 0.1 |
| 13 | 43.0 | 4.0 | 2.0 | 33.9 | 5.6 | 0 | 0 | 9.5 | 2.0 | 1.0 | 0.2 |
| 14 | 47.5 | 20.0 | 2.5 | 14.0 | 4.0 | 6.0 | 6.0 | 0 | 0 | 0.5 | 0 |
| 15 | 70.0 | 3.0 | 7.0 | 9.0 | 5.5 | 5.5 | 0 | 0 | 0 | 0.5 | 0 |
| 16 | 46.0 | 7.0 | 2.0 | 39.0 | 0 | 0 | 0 | 0 | 6.0 | 1.0 | 0.2 |

(wt.%)

Table 2

| specimen No. | $\eta d$ | $\nu d$ | Phg | Lt(°C)* | Da ** |
|---|---|---|---|---|---|
| 1 | 1.54964 | 66.22 | 0.4432 | 850 | 3rd class |
| 2 | 1.55377 | 65.90 | 0.4458 | 905 | |
| 3 | 1.56203 | 64.79 | 0.4490 | 920 | |
| 4 | 1.56402 | 64.18 | 0.4485 | 932 | |
| 5 | 1.56682 | 63.75 | 0.4479 | 815 | |
| 6 | 1.57425 | 65.23 | 0.4459 | 820 | |
| 7 | 1.57672 | 63.74 | 0.4513 | 850 | |
| 8 | 1.58549 | 62.38 | 0.4496 | 870 | |
| 9 | 1.59089 | 65.50 | 0.4483 | 950 | 4th class |
| 10 | 1.60096 | 64.55 | 0.4477 | 940 | |
| 11 | 1.60554 | 62.36 | 0.4503 | 940 | |
| 12 | 1.59324 | 64.98 | 0.4484 | 910 | 3rd class |
| 13 | 1.60409 | 63.72 | 0.4483 | 910 | |
| 14 | 1.58484 | 58.95 | 0.4623 | 905 | 3rd class |
| 15 | 1.54102 | 64.12 | 0.4455 | 890 | 4th class |
| 16 | 1.60150 | 64.31 | 0.4573 | 958 | |

* Lt(°C) is the 60150

** Da is the durability of the 64.31

| Grade | Weight loss(%) by acidic attack |
| --- | --- |
| 1st class | 0.21 – 0.35 |
| 2nd class | 0.36 – 0.65 |
| 3rd class | 0.66 – 1.20 |
| 4th class | 1.21 – 2.20 |
| 5th class | $\geq$ 2.21 |

These glass specimens were prepared by blending the orthophosphoric acid, alkaline earth metal metaphosphates, and other carbonates, etc. in the amounts required for making the indicated composition above melting the composition at a temperature of from 1,280° to 1,330°C for longer than about 30 minutes, usually for a period of less than 2 hours, stirring and clarifying the molten glass and casting the molten glass followed by gradual cooling.

It is apparent from the above examples that the anomalous dispersion glass of this invention has a high Abbe's number (greater than 58) as compared to a conventional Ti-flint glass having a low Abbe's number ($\nu d$ value), i.e., less than 50, has a high partial dispersion ratio in the short wavelength ray zone, a low liquid phase temperature (below 950°C), a favorable vitrification stability, a high durability against chemical attack and good light permeability.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. An anomalous dispersion glass produced by adding both 0.3–7.0 wt. parts of $CeO_2$ and up to 2 wt. parts of $Sb_2O_3$ to 100 wt. parts of a phosphate glass which is composed of $P_2O_5$ 40–70 wt. percent, $B_2O_3$ 1–21 wt. percent, $Al_2O_3$ 1–8 wt. percent, $B_2O_3+Al_2O_3$ 2–24 wt. percent, BaO 8–42 wt. percent, ZnO 0–9 wt. percent, MgO 0–7 wt. percent, CaO 0–7 wt. percent, SrO 0–11 wt. percent, $La_2O_3$ 0–7 wt. percent, and $BaO+MgO+ZnO+SrO+CaO+La_2O_3$ 15–52 wt. percent.

2. The anomalous dispersion glass of claim 1, wherein said $CeO_2$ ranges from 0.5 to 6.0 wt. parts and said $Sb_2O_3$ ranges from 0.2 to 1.5 wt. parts and wherein said phosphate glass is composed of $P_2O_5$ 43–65 wt. percent, $B_2O_3$ 1.5–9.0 wt. percent, $Al_2O_3$ 2.0–4.0 wt. percent, $B_2O_3+Al_2O_3$ 5.0–10.0 wt. percent, BaO 13.0–40.0 wt. percent, ZnO 0–8.0 wt. percent, MgO 0–6.0 wt. percent, CaO 0–6.0 wt. percent. SrO 0–10.0 wt. percent, $La_2O_3$ 0–6.0 wt. percent and $BaO+MgO+ZnO+SrO+CaO+La_2O_3$ 30.0–51.0 wt. percent.

* * * * *